(12) United States Patent
Till et al.

(10) Patent No.: US 11,705,848 B2
(45) Date of Patent: Jul. 18, 2023

(54) METHOD FOR ACTUATING AN ELECTRICAL CIRCUIT ARRANGEMENT COMPRISING AT LEAST ONE SWITCHING ELEMENT, A CONTROL UNIT, AN ELECTRICAL CIRCUIT DEVICE, AND A MOTOR VEHICLE

(71) Applicant: AUDI AG, Ingolstadt (DE)

(72) Inventors: Stefan Till, Ingolstadt (DE); Alexander Tkatschenko, Schernfeld (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/696,367

(22) Filed: Mar. 16, 2022

(65) Prior Publication Data

US 2022/0345064 A1 Oct. 27, 2022

(30) Foreign Application Priority Data

Apr. 21, 2021 (DE) .......................... 102021110139.5

(51) Int. Cl.
*H02P 27/06* (2006.01)
*B60L 50/60* (2019.01)

(52) U.S. Cl.
CPC ............... *H02P 27/06* (2013.01); *B60L 50/60* (2019.02)

(58) Field of Classification Search
CPC .... H02P 27/06; H02P 27/085; H02M 7/5395; H02M 1/08; H02M 1/088; H02M 7/5387
See application file for complete search history.

(56) References Cited

U.S. PATENT DOCUMENTS

| 4,099,109 A * | 7/1978 | Abbondanti | ............ H02P 27/08 318/722 |
| 2008/0106917 A1* | 5/2008 | Holt | ...................... H02M 3/157 363/26 |
| 2019/0324076 A1* | 10/2019 | Klingspor | ............... H02M 1/08 |

FOREIGN PATENT DOCUMENTS

EP 3796541 A1 3/2021

OTHER PUBLICATIONS

Extended European Search Report dated Aug. 29, 2022 in corresponding European Patent Application No. 22161266.6, 18 pages (including English translation).

* cited by examiner

*Primary Examiner* — Elim Ortiz
(74) *Attorney, Agent, or Firm* — Maier & Maier, PLLC

(57) ABSTRACT

A method for actuating an electrical circuit arrangement including at least one switching element. The switching element is actuated by a driver circuit as a function of switching-signal information for switch-on and switch-off. The switching-signal information is continuously determined and a switch-on period and signal position information are specified respectively for at least one switching-signal time window with a fixed duration. The position of the switch-on signal within the switching-signal time window is specified by the signal position information for a switch-on signal that results from a switch-on period that is less than the duration of the switching-signal time window.

17 Claims, 4 Drawing Sheets

METHOD FOR ACTUATING AN ELECTRICAL CIRCUIT ARRANGEMENT COMPRISING AT LEAST ONE SWITCHING ELEMENT, A CONTROL UNIT, AN ELECTRICAL CIRCUIT DEVICE, AND A MOTOR VEHICLE

FIELD

The invention relates to a method for actuating an electrical circuit arrangement comprising at least one switching element, the switching element being actuated by a driver circuit as a function of switching-signal information for switch-on and switch-off, and the switching-signal information being continuously determined. Furthermore, the invention relates to a control unit, an electrical circuit device, and a motor vehicle.

BACKGROUND

Motor vehicles with an electric drive usually comprise a synchronous machine or an asynchronous machine as the electric traction motor, which is supplied from a traction battery of the motor vehicle via power electronics. The direct current emitted by the traction energy storage device is converted into alternating current by means of the power electronics in order to operate the electric traction motor. As a result, a voltage can be applied to the input terminals of a three-phase electric machine, for example, with the voltage difference generating a current flow in the electric machine and the desired torque of the electric traction motor.

In this case, the switching elements are actuated on the basis of specifications which depend, for example, on the driving mode or the current operating state of the motor vehicle. In this case, the aim is to switch the individual switching elements of the power electronics in such a way that a sinusoidal phase current is generated with the desired phase offset between voltage and amplitude.

In order to reduce and/or avoid the occurrence of harmonics, which can result in undesired losses and/or instability in current regulation, it is necessary for the voltage delivered by the power electronics to the motor to be as close as possible to a sinusoidal shape. In order to generate an alternating voltage that is as sinusoidal as possible from the direct voltage emitted by the traction battery, it is necessary for the switching elements to be switched at a higher frequency than the fundamental frequency of the alternating current to be generated. For example, it may be desirable to vary the output voltage at least ten times per period of the fundamental wave of the sinusoidal phase current, i.e. to carry out ten switching operations of the switching elements.

Since the fundamental frequency of the sinusoidal current increases as the speed increases, particularly in a traction drive of a motor vehicle, the switching elements must also be actuated ever faster in order to maintain the desired ratio between the actuation of the switching elements and the frequency of the fundamental waves of the alternating voltage generated. This requires that corresponding switching-signal information, which relates to the alternating voltage to be set, also be determined at a higher speed, so that it is available for the corresponding actuation of the switching elements. Since separate switching-signal information must usually be calculated for each switching operation, a computing device has to calculate a frequency that corresponds to the multiple of the frequency of the fundamental wave of the alternating voltage to be generated according to the desired switching operations.

Consequently, as the switching frequencies increase, the time available for determining this switching-signal information is also reduced, which results in high demands on the performance of a computing device used for determining the switching-signal information. The need to carry out several switching operations per period of the fundamental wave of the alternating voltage to be generated requires the use of faster computing devices, which can carry out the required calculations in a correspondingly shorter time, with increasing frequencies of the fundamental wave or high-frequency operation of the electric traction machine. However, faster computing devices with a higher computing frequency are generally more expensive, and the complexity of the computing operations themselves and of the communication between the components of the traction drive also increases. It is therefore desirable to specify a method which enables decoupling between the switching frequency and the computing frequency.

SUMMARY

To achieve this object, it is envisaged in a method of the type mentioned at the outset that the switching-signal information specifies a switch-on period and signal position information for at least one switching-signal time window with a fixed duration, with a switch-on signal resulting from a switch-on period that is less than the duration of the switching-signal time window, the position of the switch-on signal within the switching-signal time window being indicated by the signal position information.

The switching-signal information comprises a switch-on period and signal position information. The switching-signal information can be continuously determined by a computing unit, for example a control unit, with a computing frequency and transmitted, via an interface, to the driver circuit for actuating the switching element. The switch-on period with which the switching element is switched on within the switching-signal time window corresponds to a duty cycle of the switching element and indicates the proportion of the switching-signal period or the switching-signal time window for which the switching element is switched to be conductive. In previous methods for actuating a switching element, the switching element is generally actuated with a center-synchronous actuation, in which the switch-on signal lies in the center of a single, assigned time window. The duration of the switch-on signal, i.e. the width of the switch-on pulse, depends on the duty cycle to be set or the duration in which the switching element is to be switched to be conductive.

The signal position information advantageously results in an additional degree of freedom for the positioning of the switch-on signals within the switching-signal time window. The position of the switch-on signal within the switching-signal time window relates to a chronological position of the switch-on signal within the switching-signal time window. The switch-on signal can be a rectangular pulse, for example, which lies between a first level, which corresponds to a logic 0 for a switched-off switching element, and a second level, which corresponds to a logic 1 for a switched-on switching element. For this pulse, the position in the switching-signal time window, i.e. the beginning and the end of the rectangular pulse in relation to the beginning and the end of the switching-signal time window, can be indicated by the position information. It is also possible that a division of the switch-on signal into two or more partial signals is described, with a position in the switching-signal time window also being defined in particular for each part of the switch-on signal.

The method according to the invention enables decoupling between a computing frequency, i.e. the frequency at which new switching-signal information is present, and the frequency at which the switching element is switched. For this purpose, a position of the switch-on signal within the switching-signal time window is specified for each piece of switching information for one or more switching-signal time windows, in addition to the switch-on period. This makes it possible for the position of the switch-on signal to be varied within the switching-signal time window.

According to the invention, the switching-signal information can specify a switch-on period and a position of the switch-on signal for two or more switching-signal time windows. This makes it possible for the position of the switch-on signals to generate separate switch-on signals for each switching-signal time window, for example. It is also possible for common total switch-on pulses to be formed over several switching-signal time windows, as will be explained in more detail below. In this way, the switching element can be actuated independently of the frequency with which the switching-signal information is continuously determined, for example by a control unit. This decoupling means that a higher actuation frequency can also be selected when it is necessary, for example, to carry out several switching operations for a fundamental wave of an alternating voltage to be generated, since the maximum frequency with which the switching element is switched is no longer dependent on the computing frequency with which the switching-signal information is determined.

Furthermore, a lower switching frequency can be generated by total switch-on pulses continuous over several switching-signal time windows, whereby a calculation quality of complex functions, for example speed filtering, can be maintained even when the switching frequency is reduced, for example halved. Since there is one piece of switching-signal information per computing period, the switch-on edge and the switch-off edge of a total switch-on pulse continuous over several switching-signal time windows can each be calculated as separate pieces of switching-signal information, which means that a control bandwidth can be significantly increased. A reduction in the switching frequency can thus advantageously be implemented by the method according to the invention with a control bandwidth that is increased compared to a center-synchronous actuation.

Compared to a purely center-synchronous actuation, in which the switch-on signal is symmetrical and the chronological center point of a, for example, twice-as-large switching-signal time window is arranged, the ratio between the computing frequency and the switching frequency with which the switching element is actuated can be adapted with the method according to the invention by using shorter switching-signal time windows and by shifting the switch-on signal within the switching-signal time window.

It is advantageously possible to select the switching frequency of the switching element to be higher than the computing frequency if one switch-on period and one piece of signal position information are determined for each piece of switching-signal information, i.e. for each computing period, for two or more switching-signal time windows, and/or if the signal-position information means that the switch-on signal is divided into several partial signals. The method according to the invention can advantageously be used to increase the switching frequency without using faster computing devices and in particular while maintaining a desired degree of utilization, as a result of which costs can be saved in the production of a switching device. In addition or as an alternative thereto, however, it is also possible to select the switching frequency to be lower than the computing frequency, for example by combining the switch-on signals into individual switching-signal time windows to form a common total switch-on pulse, so that when the method according to the invention is used and the same interface is used, the actuation of the switching element can be variably adapted to different conditions and requirements.

A position of the switch-on signal is specified in this case at least for the switch-on signals where the switch-on period is less than the duration of the switching-signal time window, i.e. for switch-on signals which correspond to a duty cycle of less than 100%. A position of the switch-on signal within the switching-signal time window can be specified in particular for switch-on signals where the switch-on period is greater than zero and less than the duration of the switching-signal time window. A switch-on signal where the switch-on period corresponds to the duration of the switching-signal time window or a switch-on signal which corresponds to a switching element that is permanently switched off for the duration of the switching-signal time window cannot be assigned a special position, since the switching state of the switching element is always the same within the switching-signal time window, and the switch-on signal therefore does not change within the switching-signal time window.

It is nevertheless possible within the scope of the method according to the invention to also use switch-on periods which correspond to a permanently switched on or a permanently switched off switching signal, i.e. a duty cycle in the switching-signal time window of 100% or 0%, in which no separate signal level information must be transmitted for this switching-signal time window or in which a transmitted piece of signal level information is a switch-on signal describing a continuously switched on or continuously switched off switching element without affecting it the for the duration of the switching-signal time window.

Furthermore, it can be provided that a minimum switch-on period or a maximum permissible switch-on period, which is less than the duration of the switching-signal time window, is provided in order to take into account the maximum switching speed of the switching element and therefore not to request any switching operations that cannot be physically implemented by the switching element. This keeps the switching-signal information from not requesting switch-on periods that are too short or switch-off times that cannot be set by the switching element.

According to the invention, it can be provided that the signal position information indicates a position from a group of several possible positions. As a result, the basically infinite number of possibilities can advantageously be reduced to a manageable extent, with which possibilities a switch-on signal with a duration that is less than the duration of the switching-signal time window is arranged within the switching-signal time window. Advantageously, this makes it possible to assign a number to the individual positions from the group of several possible positions and to use this number as signal position information. This advantageously makes it possible for this number to be transmitted to the driver circuit, for example, as signal position information via a corresponding interface, and for the driver circuit to carry out the corresponding position of the switch-on signal, for example as a function of a stored assignment rule.

In a preferred embodiment of the invention, the group of possible positions comprises a switch-off edge position, in which the switch-on signal begins directly at the beginning of the switching-signal time window; a switch-on edge position, in which the switch-on signal ends directly at the end of the switching-signal time window; a center-synchronous position, in which the switch-on signal lies in the center of the switching-signal time window; and/or an inverse position, in which a first part of the switch-on signal begins directly at the beginning of the switching-signal time window and a second part of the switch-on signal ends at the end of the switching-signal time window, with there being a switch-off phase between the first part and the second part.

With the switch-off edge position, the switch-on signal begins directly at the beginning of the switching-signal time window. Depending on the time duration of the switch-on signal, consequently thus on the switch-on period, there is a switch-off edge within the switching-signal time window. The switch-off edge is followed by a switch-off phase which extends to the end of the switching-signal time window. In the switch-off phase, the switch-on signal is at a level which corresponds to a switched-off switching element.

With the switch-on edge position, the switch-on signal ends with the end of the switching-signal time window, with a switch-on edge position being within the switching-signal time window depending on the time duration of the switching signal. There is a switch-off phase from the start of the switching-signal time window to the switch-on edge, with a switch-on phase following the switch-on edge corresponding to the switch-on signal.

The position of the switch-on edge and the position of the switch-off edge can be used in order to combine several switch-on signals into total switch-on signals or total switch-on signals which extend beyond the end of a switching-signal time window. In particular, it is possible to combine the position of the switch-on edge and the position of the switch-off edge with additional switch-on signals which have a switch-on period corresponding to the entire duration of the switching-signal time window. One or more additional switch-on signals, which correspond to a duty cycle of 100%, can be arranged in time between a switch-on signal in the switch-on edge position and a switch-on signal in the switch-off edge position, so that combined switch-on signals can be generated over several switching-signal time windows.

A further possible position of the switch-on signal is a center-synchronous position in which the switch-on signal lies in the middle of the switching-signal time window. This makes it possible for several of these center-synchronous switch-on signals to be generated in succession, resulting in a switch-on frequency that is increased by the number of switching-signal time windows used compared to the computing frequency with which the switching-signal information is determined. When two switching-signal time windows are used, the switching frequency can thus be doubled compared to the computing frequency. Accordingly, when more than two switching-signal time windows are used, a further increase in the switching frequency can be implemented compared to the computing frequency.

The inverse position, in which the first part of the switch-on signal begins directly at the beginning of the switching-signal time window and a second part of the switch-on signal ends at the end of the switching-signal time window, provides the possibility of having a switch-off phase between the first part and the second part of the switch-on signal, also within a switching-signal time window. The duration of the switch-off phase in this case results from the switch-on period of the switch-on signal according to the switching-signal information. The switch-off phase lies in particular symmetrically around the chronological midpoint of the switching-signal time window, such that an inverse center-synchronous position of the switch-on signal results. By means of the inverse position, a switch-on signal that started in a previous switch-signal time window can be ended and a new switch-on signal can be started within a switching-signal time window.

By combining the different positions of the switch-on signal from the group of possible positions, state changes between switch-on phases and switch-off phases can advantageously be implemented at any point in time. This has the advantage that, for example, an output voltage generated via the at least one switching element can be converted very precisely. A voltage used as a control variable, for example a multi-phase stator voltage, can be implemented more precisely in this way, particularly in connection with regulation, which has a positive influence on the accuracy of a current to be set and in particular a torque of an electric machine supplied via the current.

The different positions of the group of possible positions enable the frequency to be increased by a factor of 2 or more using a manageable amount of computing effort and with the computing frequency remaining the same. In addition to these positions, a permanently switched on switch-on signal and a permanently switched off switch-on signal can also be used. In particular, the positionings resulting from the positions and the switch-on periods can be combined to generate continuous signals, for example by maintaining the states between two successive switching-signal time windows and generating a state change via the switch-on edge position, the switch-off edge position, and/or the inverse position.

In addition to doubling the frequency, it is also possible to halve the frequency or further reduce the switching frequency compared to the computing frequency. The four different positions also reduce the amount of information that has to be transmitted to the driver circuit as switching-signal information, which can advantageously lead to less complexity of an interface used for this purpose.

According to the invention, it can be provided that, with the switching frequency to be set of the at least one switching element, which switching frequency is lower than a computing frequency with which the switching-signal information is continuously determined, the position of several successive switch-on signals is selected such that a total switch-on pulse results that is continuous over several switching-signal time windows. The continuous total switch-on pulse consists of a switch-on edge or a rising edge within a first switching window, one or more switch-on states for a longer period in one or more further switching-signal time windows, and a switch-off edge position in a last switching-signal time window.

In a preferred embodiment of the invention, it can be provided that, with the switching frequency to be set of the at least one switching element, which switching frequency is higher than a computing frequency with which the switching-signal information is continuously determined, several successive switch-on signals are generated, each with a central arrangement in the switching-signal time window. This makes it possible to set a multiple of the computing frequency, with which the switching information is determined, as a sequence of periodic switch-on signals. Center-synchronous switch-on signals, for example, are output for each piece of switching-signal information determined, in particular for two or more switching-signal time windows. The sequence of switch-on signals can in particular extend over several determined pieces of switching-signal information and, in particular in a plurality of switching-signal time windows assigned to respectively different pieces of switching-signal information, can also comprise switch-on signals with a different switch-on period or a different pulse width or a different duty cycle.

According to the invention, it can be provided for the circuit arrangement that it comprises several switching elements which are actuated by the driver circuit for switching on and off as a function of one or more pieces of switching-signal information. For example, several switching elements can each be switched via a piece of switching-signal information. It is also possible for two or more transistors, which form a common switching unit, to be operated using common switching-signal information. In a half-bridge, for example, the high-side transistor can be switched as a function of the switching-signal information, with the low-side transistor being switched in a complementary manner, so that it is switched off during the switch-on phases of the high-side transistor and switched on during the switch-off phases of the high-side transistor.

According to the invention, a three-phase pulse-controlled inverter, in particular, can be used as the electrical circuit arrangement. In this case, for example, each of the three phase currents can be generated by actuating one or more switching elements, in particular a half-bridge comprising two of the switching elements. The pulse-controlled inverter can comprise three half-bridges, for example, so that a three-phase alternating voltage can be generated by the electrical circuit arrangement. The pulse-controlled inverter can preferably be operated bidirectionally, so that a reverse current conversion is also possible, for example when a connected motor is operated as a generator.

According to the invention, it can be provided that the switching-signal information is determined by a control unit, in which at least one measured value, in particular a stator current measured value and/or an angular position measured value of an electric machine connected to the electrical circuit arrangement, is supplied to the control unit in order to determine a piece of switching-signal information.

Each piece of switching-signal information can thus be based on one or more measured values, for example a measured stator current value and/or a measured angular position value of an electric motor powered by the electric circuit arrangement. The switching-signal information can occur, for example, as a function of motor operation and/or generator operation of the electric machine. The measured value or the measured values are determined, in particular with at least one measuring frequency corresponding to the computing frequency, via one or more measuring devices assigned to the electric machine and/or the electrical circuit. In particular, new or current measured values are available for each piece of switching-signal information to be determined.

According to the invention, it can be provided that the switching-signal information is selected as a function of an operating point of the electrical circuit arrangement and/or an operating point of an electric machine connected to the electrical circuit arrangement. This makes it possible, for example, for a switching frequency, to be set, of the at least one switching element to be selected and set as a function of the operating point of the electrical circuit arrangement or the operating point of the electric machine connected to the electrical circuit arrangement. As a result, in particular a switching frequency can be used at which the electrical circuit arrangement and/or the electric machine have a minimum loss. A dependency between the possible operating points of the electrical circuit arrangement and/or the possible operating points of the electric machine connected to the electrical circuit arrangement can be stored, for example, in a control unit configured to carry out the method.

It is provided for a control unit according to the invention for actuating a driver circuit for an electrical circuit arrangement comprising at least one switching element that it is designed to carry out a method according to the invention.

It is provided for an electrical circuit device according to the invention that it comprises a driver circuit, an electrical circuit arrangement comprising at least one switching element, and a control unit according to the invention.

It is provided for a motor vehicle according to the invention that it comprises an electrical circuit device according to the invention.

All the advantages and configurations described above in relation to the method according to the invention apply correspondingly to the control unit according to the invention, the electrical circuit device according to the invention, the motor vehicle according to the invention, and vice versa. Accordingly, the advantages and details of the control unit according to the invention also apply to the electrical circuit device according to the invention and the motor vehicle according to the invention and vice versa. In addition, the advantages and details of the electrical circuit device according to the invention also apply to the motor vehicle according to the invention and vice versa.

BRIEF DESCRIPTION OF THE FIGURES

Further advantages and details of the invention result from the exemplary embodiments described below and from the drawings. These are schematic representations and show the following.

DETAILED DESCRIPTION

Figure 1:
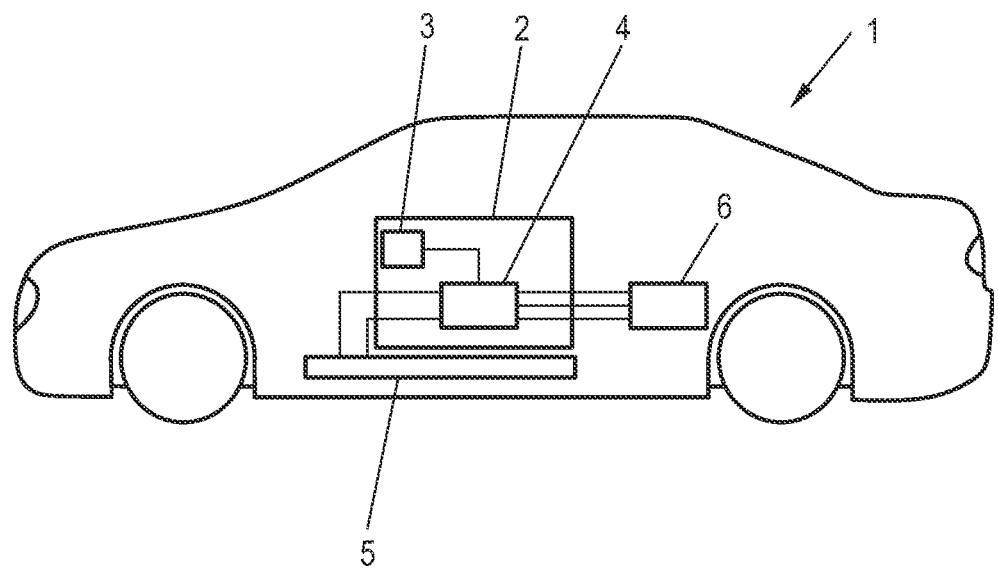
FIG. 1 an exemplary embodiment of a motor vehicle according to the invention.

FIG. 1 shows an exemplary embodiment of a motor vehicle 1. The motor vehicle 1 comprises an electrical circuit device 2 and a control unit 3, which is designed to actuate an electrical circuit arrangement 4 of the electrical circuit device 2, which electrical circuit arrangement comprises at least one switching element. The electrical circuit arrangement 4 is used to convert a direct voltage, which is provided by a traction energy storage device 5 of the motor vehicle, into a particularly three-phase alternating voltage for operating an electric traction motor 6 of the motor vehicle 1. A reverse conversion of a current in generator operation of the electric traction motor 6 is also possible. The electric traction motor can be designed, for example, as a synchronous machine or as an asynchronous machine. The traction energy storage device 5 can, for example, be a battery, for example a high-voltage battery.

Figure 2:
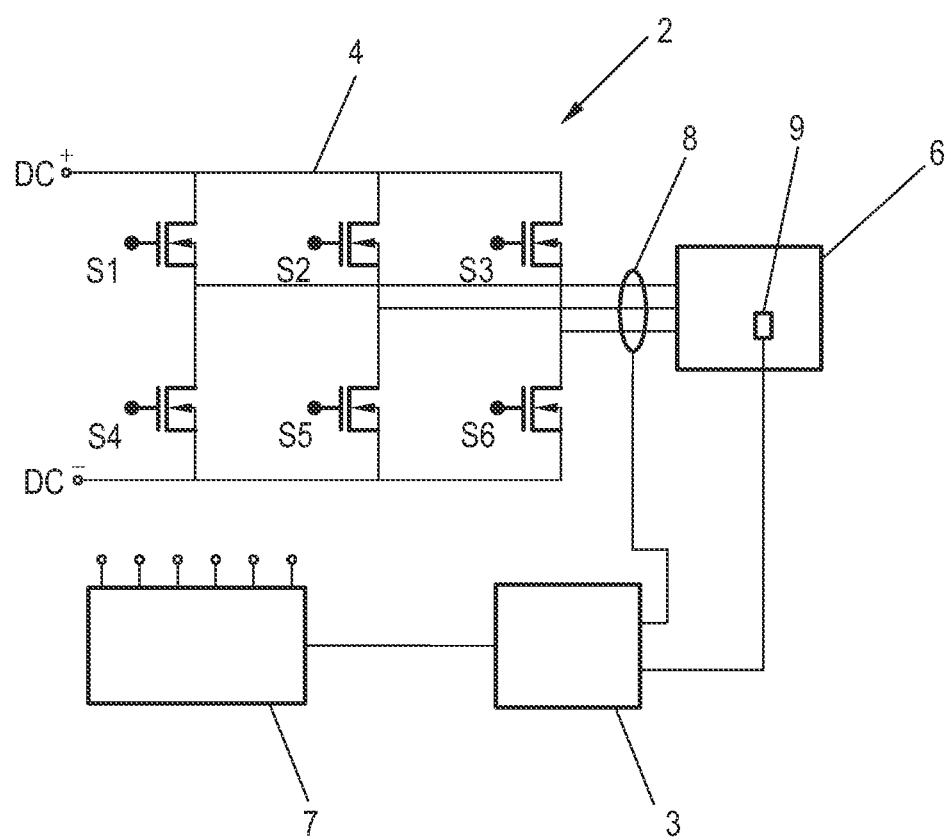
FIG. 2 an exemplary embodiment of an electrical circuit device according to the invention, comprising a control unit according to the invention for executing an exemplary embodiment of a method according to the invention.

An electrical circuit device 2 is shown in FIG. 2. In addition to the control unit 3 and the electrical circuit arrangement 4, which is designed as a three-phase pulse-controlled inverter, the electrical circuit device 2 also comprises a driver circuit 7, which is used to actuate the switching elements $S_i$ of the circuit arrangement 4. The connections between the driver circuit 7 and the gate terminals of the switching elements $S_1$-$S_6$ are not shown for reasons of clarity. The switching elements $S_1$-$S_6$ are implemented as transistors, for example as metal-oxide-semiconductor field-effect transistors or as bipolar transistors with an insulated gate.

The control unit 3 continuously determines switching-signal information, which is transmitted from the control unit 3 to the driver circuit 7 via an interface. Depending on the switching-signal information, the driver circuit 7 actuates at least some of the switching elements $S_i$ of the circuit arrangement 4. The circuit arrangement 4 is connected to the traction energy storage device 5, which is not shown here, at terminals $DC^+$ and $DC^-$.

The control unit 3 is configured to actuate the driver circuit 7 for actuating at least one switching element $S_i$ of switching elements $S_1$-$S_6$ of the electrical circuit arrangement 4. The respective switching element $S_i$ is actuated by the driver circuit 7 as a function of the switching-signal information for switch-on and switch-off. The switching-signal information is continuously determined by the control unit 3 with a computing frequency. The length of time that lies between the determination of two pieces of switching-signal information is limited by the maximum possible computing frequency and thus by the computing power of the control unit 3.

The control unit 3 can determine the switching-signal information, for example, as a function of at least one measured value. For this purpose, the control unit 3 can be connected, for example, to one or more measuring means, which are assigned to the circuit arrangement 4 and/or the electric machine 6. The measuring means can be, for example, a stator current measuring means 8 and/or an angular position measuring means 9, which accordingly transmit a stator current measured value or an angular position measured value to the control unit 3.

The signal position information specifies a switch-on period and signal position information for at least one switching-signal time window with a fixed duration. In this case, the position of the switch-on signal within the switching-signal time window is specified by the signal position information for a switch-on signal that results from a switch-on period that is less than the duration of the switching-signal time window. The positions of a group of possible positions of a switch-on signal 10 within a first switching-signal time window 11 are shown below in FIGS. 3 to 8 by way of example. The time is shown on the abscissa and the signal level of the switch-on signal 10 is shown on the ordinate. No switch-on signal 10 is shown for the second switching-signal time window 12, which is also within the computing period $T_{calc}$.

Figure 3:
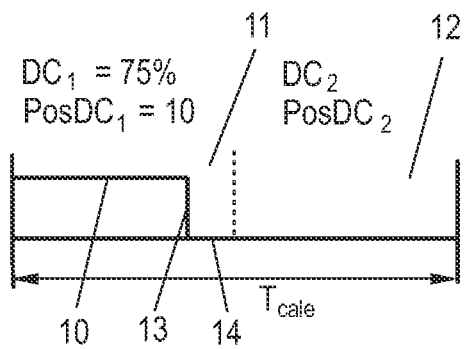
FIG. 3 diagram for showing the different positions of a switch-on signal within a switching-signal time window.

A diagram is shown in FIG. 3 which represents a switch-off edge position of the switch-on signal 10. In the present exemplary embodiment, there are two switching-signal time windows 11, 12 within the computing time of the control unit 3 designated by $T_{calc}$, i.e. the reciprocal of the computing frequency of the control unit 3. For the first switching-signal time window 11, a switch-on signal 10 is shown, which is in a switch-off edge position. The switch-on signal 10 begins directly at the beginning of the switching-signal time window 11. The switching signal 10 is assigned a switch-on period $DC_1$ which, in the present example, corresponds to 75% of the duration of the switching-signal time window 11. This means that the switch-on period $T_e$ of the switch-on signal 10 corresponds to 75% of the duration of the switching-signal time window 11 or a duty cycle of 75%. Accordingly, the switch-on signal 10 is switched on at the beginning of the switching-signal time window 11 for 75% of the duration of the switching-signal window 11 in a switch-on phase, followed by a switch-off edge 13. There is a switch-off phase 14 between the switch-off edge 13 and the end of the switching-signal time window 11. The switch-on phase is formed by a first signal level of the switching signal, which differs from a second signal level that characterizes the switch-off phase 14.

Figure 4:
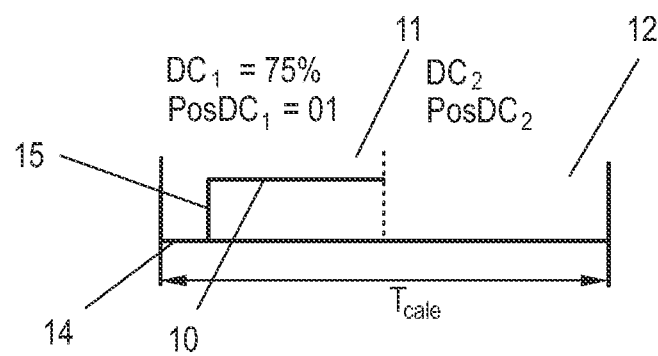
FIG. 4 diagram for showing the different positions of a switch-on signal within a switching-signal time window.

A switch-on edge position of the switch-on signal 10 is shown in FIG. 4. In this example, too, the switch-on period $DC_1$ is 75% of the duration of the switching-signal time window 11. In the switch-on edge position, the switch-on signal 10 ends directly at the end of the switching-signal time window 11. At the beginning of the switching-signal time window 11, there is a switch-off phase 14, which is followed by a switch-on edge 15, and the switch-on signal 10 for the remaining duration of the switching-signal time window 11 corresponding to the switch-on period is at the first signal level, which indicates a switched-on switching element $S_i$.

Figure 5:
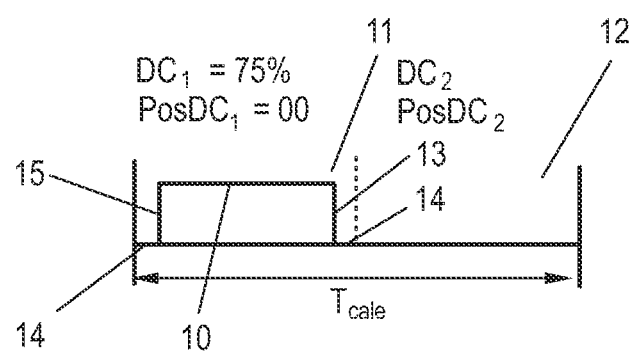
FIG. 5 diagram for showing the different positions of a switch-on signal within a switching-signal time window.

FIG. 5 shows a center-synchronous position of the switch-on signal 10. In this position, the switch-on signal is in the middle of the switching-signal time window 11. In this example, too, the switch-on period is 75% of the duration of the switching-signal time window 11. There is a switch-off phase 14 after the switch-off edge 13 or before the switch-on edge 15 of the switch-on signal 10.

Figure 6:
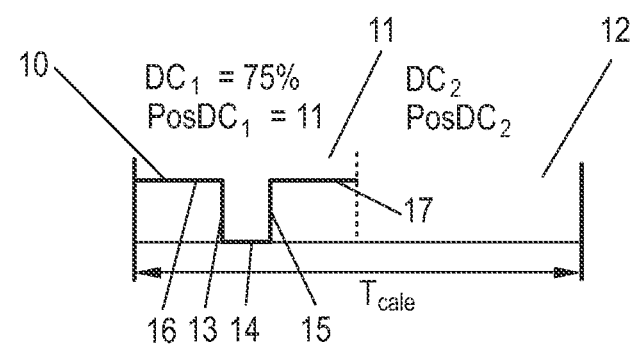
FIG. 6 diagram for showing the different positions of a switch-on signal within a switching-signal time window.

FIG. 6 shows an inverse position of the switch-on signal 10 in the switching-signal time window 11, with a first part 16 of the switch-on signal 10 beginning directly at the start of the switching-signal time window 11 and a second part 17 of the switch-on signal 10 ending at the end of the switching-signal time window 11. There is a switch-off phase 14 between the first part 16 and the second part 17 of the switch-on signal 10. In this exemplary embodiment too, the switch-on signal is switched on for 75% of the duration of the switching-signal time window 11.

There is a switch-off edge 13 of the switching signal 10 between the first part 16 and the switch-off phase 14. Accordingly, there is a switch-on edge 15 between the switch-off phase 14 and the second part 17 of the switch-on signal 10. The switch-off phase 14 lies in the middle of the switching-signal time window 11, so that overall the first part 16 and the second part 17 of the switch-on signal 10 result in the required switch-on period $DC_1$ of 75%.

The positions shown above can advantageously be numbered, as shown by way of example by value $PosDC_1$ as a 2-bit binary number. This makes it possible for the signal position information to be transmitted from the control unit 3 to the driver circuit 7 as a numerical value $PosDC_1$. Correspondingly, an assignment rule can be stored in the driver circuit 7, which assignment rule carries out an actuation of switching element $S_1$, for example, according to the signal position information $PosDC_1$ and the further transmitted switch-on period $DC_1$.

It may be provided that switching signal $S_4$, which forms a half-bridge with switching element $S_1$, is switched on in the switch-off phases 14 of the switch-on signal 10, thus resulting in a complementary switching operation for switching element $S_4$. Alternatively, switching element $S_4$ can also be switched by means of its own, assigned switching-signal information. Correspondingly, this also applies to further high-side switching elements $S_2$ and $S_3$ and to corresponding further low-side switching elements $S_5$ and $S_6$. In addition to the positions shown in FIGS. 3 to 6, a switch-on period that corresponds to 100% of the duration of the switching-signal time window and a switch-on period that corresponds to 0% of the duration of the switching-signal time window are also possible.

Figure 7:
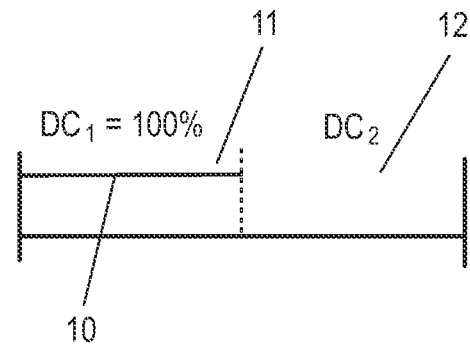
FIG. 7 a diagram for showing a switch-on signal which describes a switching element that is permanently switched on within a switching-signal time window.

FIG. 7 shows the case in which the switch-on period corresponds to 100% of the duration of the switching-signal time window 11. Accordingly, the switch-on signal 10 is at the switching level associated with a switched-on state of switching element $S_i$ for the complete period of the time window 11. A separate position does not have to be assigned to the switch-on signal 10 since the value of the switch-on signal is constant for the entire duration of the switching-signal time window 11. In this case, no signal position information or any signal position information can be transmitted.

Figure 8:
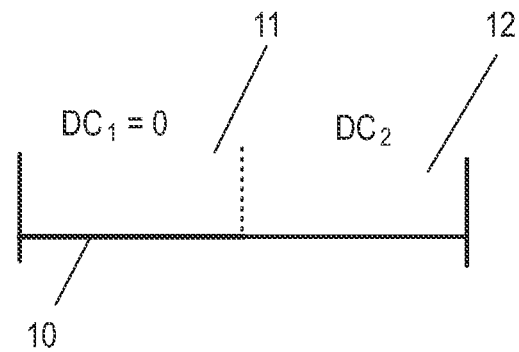
FIG. 8 a diagram for showing a switch-on signal, which describes a switching element that is permanently switched off within a switching-signal time window.

FIG. 8 accordingly shows a switch-on signal for a switch-on period of 0% of the duration of the switching-signal time window 11. The switch-on signal 10 is accordingly at the switching level corresponding to a switched-off state of switching element $S_i$ for the complete time duration of the switching-signal time window 11 so that no position or any position can be assigned in this case as well.

As already indicated above in FIGS. 3 to 8, the switching-signal time window 11 within the computing period $T_{Calc}$ is followed by at least one further signal switching window 12, which can accordingly be assigned its own switch-on period $DC_2$ and its own signal position information $PosDC_2$ of a switch-on signal 10 within the second switching-signal time window 12. This makes it possible to combine the previously illustrated individual states of the switching signals 10 with one another in order to obtain different actuations of the at least one switching element $S_i$.

The switch-on period $DC_2$ and the signal position information $PosDC_2$ are determined as common switching-signal information, in particular from the same measured values of the measuring means 8, 9. In this case, it can be provided that switch-on period $DC_2$ is equal to switch-on period $DC_1$, as a result of which the computing effort in determining the switching-signal information for the two switching-signal time windows 11, 12 can be kept low. It is also possible to use a different switch-on period, for example according to a predetermined ratio or an assignment rule stored in the control unit 3. The same position or a position different than signal position information $PosDC_1$ can be specified for signal position information $PosDC_2$ of the switch-on signal 10 in the second switching-signal time window 12, resulting in different combinations of switch-on signals or switching frequencies of the switched switching element $S_i$, as shown below.

Figure 9:
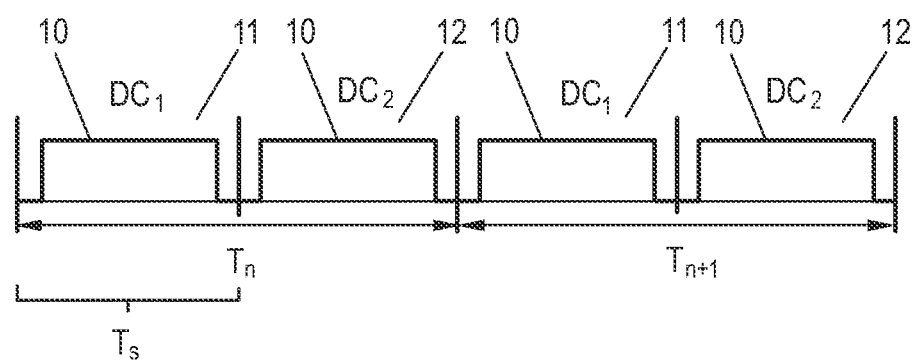
FIG. 9 a diagram for showing a first operating state of a switching element actuated by means of the method according to the invention.

FIG. 9 shows an example of the switching of one of the switching elements $S_i$. A center-synchronous switch-on signal 10 is output for each of the switching-signal time windows 11, 12 during a computing period $T_n$. The switch-on signal 10 has a switch-on period of $DC_1$ for switching-signal time window 11, and the switch-on signal 10 has a switch-on period of $DC_2$ for second switching-signal time window 12. The respective period $T_S$ of the switch-on operation is half as long as the period $T_n$ of the computing operation in which the switching-signal information is determined. This makes it possible for two switching operations of switching element $S_i$ to be carried out for each piece of switching-signal information determined. The switching frequency $f_s = 1/T_s$ with which the switching element $S_i$ is switched is consequently twice as high as the frequency with which the control unit 3 calculates the switching-signal information.

The switch-on signals 10 which are center-synchronous in the individual switching-signal time windows can also continue to be output as switching signals in a center-synchronous position for a subsequent computing period $T_{n+1}$. A new switch-on period $DC_1$ and/or $DC_2$ for the switching-signal time window 11, 12 can be selected for computing period $T_{n+1}$ as a function, for example, of new measured values evaluated by the control unit 3.

This operating state makes it possible to carry out high switching frequencies of the switching element $S_i$ even with a low computing frequency $f_{Calc} = 1/T_n$. Two or more successive center-synchronous pulses with the same current or angle information are calculated by the control unit 3 in one computing period. This operating state makes it possible, for example, to operate the electric machine 6 and the circuit arrangement 4 with minimal loss, which can be present particularly at high switching frequencies that can exceed the computing frequency $f_{Calc}$ of the control unit.

Due to the illustrated doubling of the switching frequency of the switching element $S_i$, the higher switching frequency $f_s$ can also be implemented during operation of the electric machine 6, so that losses due to harmonics or the like can be advantageously avoided, which leads to an increase in the efficiency of the electric machine 6. When using the electrical circuit device 2 in the motor vehicle 1, the range of the motor vehicle 1 in an electric driving mode, in which the electric traction motor 6 is supplied from the traction energy storage device 5, can thus advantageously be increased.

The computing time $T_n$ can be 100 μs, for example, depending on the configuration of the control unit 3. It can be provided, for example, that the control unit has a load of 80% and thus calculates switching-signal information within 80 μs, with new switching-signal information being transmitted to the driver circuit 7 via the interface every 100 μs. The switching-signal information for the switching elements $S_i$ can be transmitted to the driver circuit within the computing time window of 100 μs and can be used accordingly by this driver circuit for actuating the switching elements $S_i$. A switching frequency of 20 kHz can be achieved when two switching-signal time windows are used per computing period. In this way, a better simulation of a sinusoidal voltage curve can advantageously be achieved than would be the case with purely center-synchronous actuation in a time window that is twice as long and thus at 10 kHz. Advantageously, the frequency increase is also greater than the 12.5 kHz switching frequency, which can be achieved with an increase in utilization to 100%.

Figure 10:
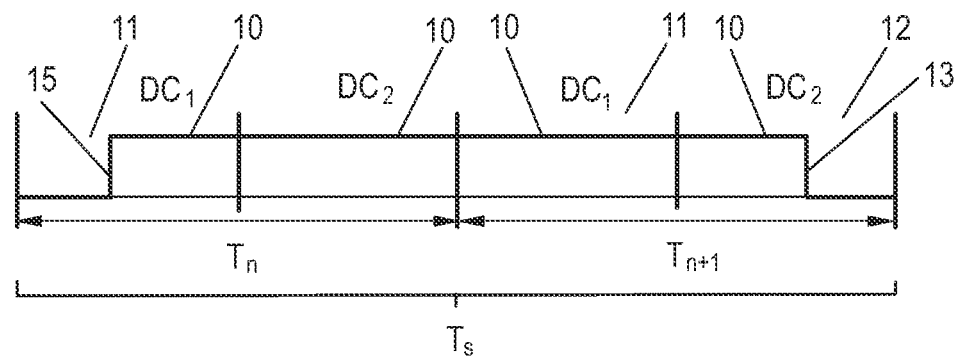
FIG. 10 a diagram for showing a second operating state of a switching element actuated by means of the method according to the invention.

FIG. 10 shows a second actuation of a switching element $S_i$ operated using the method. In this case, the switching period $T_S$ of the switching element $S_i$ is twice as long as the computing period $T_n$ or $T_{n+1}$. In this actuation mode, a switch-on signal with the switch-on period $DC_1$ is output in the first computing period $T_n$ in the first switching-signal time window 11, which switch-on period is in the switch-on edge position.

A switched-on switch-on signal with $DC_2$ equal to 100% is correspondingly output continuously in the subsequent switching-signal time window 12. Correspondingly, a permanently switched-on switch-on signal with a switch-on period of $DC_1$ equal to 100% is output for the second computing period $T_{n+1}$ for the first signal switching window 11. In the subsequent switching-signal time window 12, a switch-on signal 10 with a switch-on period $DC_2$ of, for example, 75% is output in the switch-off edge position. This leads to a total switch-on pulse 18 being output over the two computing periods $T_n$ and $T_{n+1}$. Due to the width of this pulse over a number of switching-signal time windows 11, 12, the switching frequency $f_s=1/T_s$ is half the frequency $f_n=1/T_n$. The switch-on edge 15 of the total switch-on pulse 18 is set at the beginning in the first switching-signal time window 11, and the switch-off edge 13 is correspondingly set in the last switching-signal time window 12 of the second computing period $T_{n+1}$.

Figure 11:
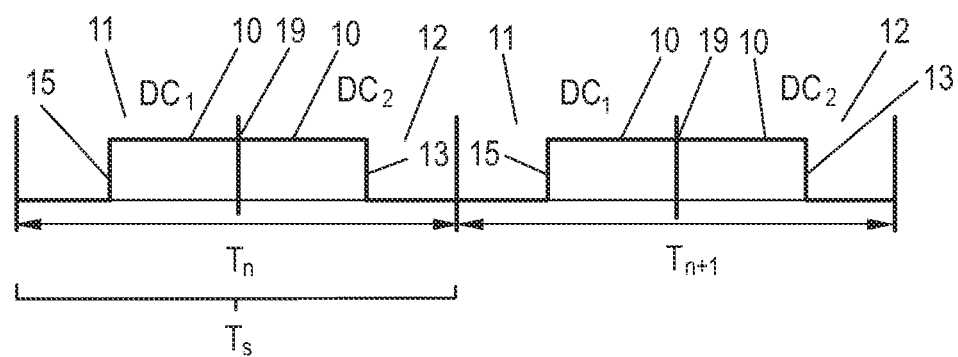
FIG. 11 a diagram for showing a third operating state of a switching element actuated by means of the method according to the invention.

A third actuation state of one of the switching elements $S_i$ is shown in FIG. 11. In this actuation state, a switch-on signal 10 is output in the position of the switch-on edge and with a switch-on period $DC_1$ of, for example, 40% in the first switching-signal time window 11. A switch-on signal 10 is correspondingly set in the switch-off edge position, likewise with a switch-on period $DC_2$ of 40%, in the subsequent, second switching-signal time window 12 of the first computing period $T_n$. A switch-on signal 10 is accordingly output in the first switching-signal time window 11 with a switch-on period $DC_1$ in the subsequent computing period $T_{n+1}$, and a further switch-on signal is output in the switch-off edge position with the switch-on period $DC_2$ in the second switching-signal time window 12.

It is possible for switch-on periods $DC_1$ and $DC_2$ in the second computing period $T_n$ to be equal, but to differ from periods $DC_1$ and $DC_2$ in the switching-signal time window 11, 12 belonging to the first computing period N. For computing period $T_{n+1}$, the switching-signal information is determined on the basis of new measured values transmitted to the control unit 3, so that a different pulse width of the total switch-on pulse 19 resulting herein can result. In this exemplary embodiment, the switching frequency $f_s=1/T_s$ is equal to the computing frequency $f_n=1/T_n$.

This makes it possible to implement different actuation cycles using the method for actuating at least one switching element $S_i$. In addition to a standard case in which switch-on period $DC_1$ is equal to switch-on period $DC_2$, the method according to the invention can also be used to generate total switch-on pulses 19 that are asymmetrical, i.e. in which a different switch-on period $DC_2$ is provided in the second switching-signal time window 12 than provided for the first switching-signal time window 11.

It is possible that further actuation operations are generated, in particular using the inverse switch-on signal shown in FIG. 6 and the permanent off state shown in FIG. 8. In this way, further actuation signals can be generated, which can be further adapted in their time profile to the optimal operating conditions of the electrical circuit arrangement 4 and/or the electric machine 6. It is also possible for three or more switching-signal time windows to be used in addition to the example in which two switching-signal time windows 11, 12 are used per computing period $T_n$. In particular, this also enables the switching frequency $f_s$ to be increased by more than a factor of 2 compared to the computing frequency $f_n$. The further positions of the switch-on signals 10 shown in FIGS. 3 to 6 make it possible to achieve an actuation state in such cases in which the switching frequency $f_s$ is equal to the computing frequency $f_n$ or in which the switching frequency $f_s$ is less than the switching frequency $f_n$.

In addition to the positions shown, further positions are also possible which, for example, contain more than one complete switch-on pulse, i.e. two or more pairs of switch-on edges and switch-off edges. The switch-on period for the switching-signal time window can be divided into two or more partial switch-on signals, which are combined, in particular over several switching-signal time windows, to form one overall periodic signal. An increase in the switching frequency can also be achieved within a switching-signal time window per computing period by means of one or more such positions. In such an embodiment, the number of possible positions increases, so that greater or more complex signal position information is required.

The method advantageously enables the highest possible switching frequency of the switching elements $S_i$ to be achieved with a predetermined, maximum processor utilization of a processor of the control unit 3. This can advantageously avoid the need for comparatively expensive control units 3 with powerful processors to operate the circuit arrangement 4 or to energize the electric machine 6. Furthermore, it is advantageously made possible that a sufficient number, for example ten, switching operations of the switching elements $S_1$-$S_6$ can still be carried out per period of the fundamental wave of the alternating voltage to be generated if fundamental waves with a higher frequency are to be generated or more switching operations can be used for a given fundamental frequency of the alternating voltage.

The invention claimed is:

1. A method for actuating an electrical circuit arrangement comprising:
    actuating at least one switching element by a driver circuit based on switching-signal information for switch-on and switch-off;
    continuously determining the switching-signal information; and
    specifying a switch-on period and a signal position for at least one switching-signal time window, the at least one switching-signal time window having a fixed duration;
    wherein the switch-on period is less than the fixed duration of the at least one switching-signal time window and the signal position describes a position of the switch-on signal relative to the at least one switching-signal time window,
    wherein a switching frequency of the at least one switching element driven by the driver circuit differs from a computation frequency at which the switching-signal information is continuously determined, and
    wherein the signal position is selected from a group of possible positions, the group of possible positions comprising:
        a switch-off edge position, whereby the switch-on signal begins directly at a beginning of the at least one switching-signal time window;
        a switch-on edge position, whereby the switch-on signal ends directly at an end of the at least one switching-signal time window;
        a center-synchronous position, whereby the switch-on signal is centered within the at least one switching-signal time window; and an inverse position, whereby a first part of the switch-on signal begins directly at the beginning of the at least one switching-signal time window, a second part of the switch-on signal ends directly at the end of the at least one switching-signal time window, and a switch-off phase is provided between the first part and the second part of the switch-on signal.

2. The method according to claim 1, wherein the switching-signal information contains the switch-on period and the signal position for two or more switching-signal time windows.

3. The method according to claim 1, wherein the switching frequency is lower than the computing frequency, and wherein the signal position of several successive switch-on signals is selected such that a total switch-on pulse results that is continuous over a corresponding several switching-signal time windows.

4. The method according to claim 1, wherein the switching frequency is higher than the computing frequency, and wherein several successive switch-on signals are generated, each with a central arrangement in the switching-signal time window.

5. The method according to claim 1, wherein the electrical circuit arrangement comprises several switching elements which are actuated by the driver circuit as a function of one or more pieces of switching-signal information for switch-on and switch-off.

6. The method according to claim 1, wherein the electrical circuit arrangement is a three-phase pulse-controlled inverter.

7. The method according to claim 1, wherein the switching-signal information is determined by a control unit based on at least one measured value.

8. The method according to claim 1, wherein the switching-signal information is determined based on an operating point of the electrical circuit arrangement and/or an operating point of a machine connected to the electrical circuit arrangement.

9. The method according to claim 7, wherein the at least one measured value is a stator current of an electric machine connected to the electrical circuit arrangement.

10. The method according to claim 7, wherein the at least one measured value is an angular position of an electric machine connected to the electrical circuit arrangement.

11. The method according to claim 1, wherein the switch-on period prescribes a duty cycle of the at least one switching element which defines a proportion of the at least one switching-signal time window during which the at least one switching element is switched to be conductive.

12. The method according to claim 2, wherein the switch-on period and/or the signal position of a first switching-signal time window contained in the switching-signal information differs from that of a second switching-signal time window contained in the switching-signal information.

13. The method according to claim 4, wherein the switching frequency is higher than the computing frequency, and wherein the switching-signal information contains the switch-on period and the signal position for two or more switching-signal time windows.

14. The method according to claim 13, wherein the switch-on period of a first switching-signal time window contained in the switching-signal information differs from that of a second switching-signal time window contained in the switching-signal information.

15. A control unit for actuating a driver circuit for an electrical circuit arrangement comprising at least one switching element, wherein the control unit is configured to:
actuate the at least one switching element by the driver circuit based on switching-signal information for switch-on and switch-off;
continuously determine the switching-signal information; and
specify a switch-on period and a signal position for at least one switching-signal time window, the at least one switching-signal time window having a fixed duration;
wherein the switch-on period is less than the fixed duration of the at least one switching-signal time window and the signal position describes a position of the switch-on signal relative to the at least one switching-signal time window,
wherein a switching frequency of the at least one switching element driven by the driver circuit differs from a computation frequency at which the switching-signal information is continuously determined, and
wherein the signal position is selected from a group of possible positions, the group of possible positions comprising:
a switch-off edge position, whereby the switch-on signal begins directly at a beginning of the at least one switching-signal time window;
a switch-on edge position, whereby the switch-on signal ends directly at an end of the at least one switching-signal time window;
a center-synchronous position, whereby the switch-on signal is centered within the at least one switching-signal time window; and
an inverse position, whereby a first part of the switch-on signal begins directly at the beginning of the at least one switching-signal time window, a second part of the switch-on signal ends directly at the end of the at least one switching-signal time window, and a switch-off phase is provided between the first part and the second part of the switch-on signal.

16. An electrical circuit device, comprising a driver circuit, an electrical circuit arrangement comprising at least one switching element, and the control unit according to claim 15.

17. A motor vehicle comprising the electrical circuit device according to claim 16.

* * * * *